Patented Dec. 3, 1935

2,023,333

UNITED STATES PATENT OFFICE 2,023,333

METHOD OF MAKING CAFFEIN-FREE COFFEE

Jean MacLang, Geneva, Switzerland, assignor to Coffex A.-G., Neuhausen, near Schaffhausen, Switzerland No Drawing. Application March 22, 1933, Serial No. 662,181. In Switzerland April 4, 1932

7 Claims. (Cl. 99—11)

A large number of processes are already known for making caffein-free coffee. The best processes for isolating caffein for the said purpose are those which employ no substances of acid or alkaline reaction and in which the extraction is carried out with extracting agents which are non-poisonous, chemically stable, odourless and tasteless, and, therefore, indifferent in every respect. Especial care must be taken, therefore, in choosing the extracting agent. It is absolutely essential to use substances which are in themselves non-injurious. These must also leave behind no odour or taste in the coffee in case, in spite of the most careful treatment, very small traces are still retained therein.

It was previously thought that extraction agents of low boiling point, e. g. those boiling between 30–45° C., could be removed from the coffee very much better than extraction agents of higher boiling point, e. g. those boiling between 45° and 80° C. This is incorrect. The higher or lower boiling point has nothing to do with the ready and rapid removal of the extraction agent from the beans. The cause of the inferior removal lies entirely elsewhere. Also, it was previously assumed that the rapid and high solubility of caffein in the extraction agents coming into question is likewise of particular importance; practical experiments showed, however, that extraction agents of very great solvent power are more difficult to remove from the coffee than those of much lower dissolving capability.

The present invention relates to a process for making caffein-free coffee in which the raw coffee is extracted with dichlorethanes, e. g. with $\alpha\alpha$-dichlorethane or $\alpha\beta$-dichlorethane or a mixture of $\alpha\alpha$-dichlorethane and $\alpha\beta$-dichlorethane.

The dichlorethanes have a considerably lower vapour pressure than dichlormethane. They are further characterized by their outstanding moistening properties, which likewise are of importance in the present case. In addition they have only a slight odour, and they do not enter into combination with constituents of coffee even on prolonged use. The coffee lipoids are practically insoluble in them.

Example

A rotating extraction autoclave is charged with 1000 kg. of raw coffee, steam or water is introduced until the total moisture content of the coffee amounts at most to 16%, the autoclave is sealed and the double jacket is heated with steam of 5 atmospheres pressure, whereupon the extractor is set into motion. In the course of an hour the interior of the autoclave is heated up to 125° C. This temperature is maintained for about 30 to 40 minutes, and then the whole is allowed to cool down to about 100° C. Seven hundred kilograms of preliminarily heated dichlorethane are then pumped in under pressure and extraction effected for 40 minutes at raised temperature. After that the extracting agent is led under pressure to a shaking apparatus and a fresh quantity of extracting agent introduced into the extractor. The procedure is repeated. In the meantime the extracting agent is freed from caffein. The extraction is continued until the coffee has a caffein content of less than 0.08%.

After the last extraction the residual portions of the extraction agent are removed from the raw coffee, preferably by introducing liquids or vapours other than water or steam under pressure and at temperatures which are higher than the boiling point of the extracting agent. Thereupon the air is withdrawn from the rotating extraction autoclaves with the result that the solvent residues draw off, and this phase of the process is repeated until no traces of foreign substances are detectable in either the distillate coming over or in the extracted material.

The coffee is then dried under diminished pressure.

Including the time for the preliminary treatment, the extraction proper and the subsequent phases, the process can be carried out within 16 to 18 hours. After appropriate roasting the coffee conforms in every respect to the requirements laid down in the foodstuffs act.

What I claim is:

1. A method of making caffein-free coffee from raw coffee beans, consisting in extracting under constant temperature the raw coffee beans with a mixture of $\alpha\alpha$-dichlorethane and $\alpha\beta$-dichlorethane thereby dissolving caffein only.

2. A method of making caffein-free coffee from raw coffee beans, consisting in heating the raw coffee beans under pressure in presence of not more than 16% of water and then extracting under constant temperature the beans with a dichlorethane thereby dissolving caffein only.

3. A method of making caffein-free coffee from raw coffee beans, consisting in heating the raw coffee beans under pressure in presence of not more than 16% of water vapour and then extracting under constant temperature the beans with a dichlorethane thereby dissolving caffein only.

4. A method of making caffein-free coffee from raw coffee beans, consisting in extracting under constant temperature the raw coffee beans with a dichlorethane adapted to dissolve caffein only, removing the extract and then subjecting the beans to pressure treatment with a non-aqueous neutral fluid at a temperature above the boiling point of the dichlorethane used for the purpose of expelling all residual traces of the latter.

5. A method of making caffein-free coffee from raw coffee beans, consisting in heating the raw coffee beans under pressure in presence of not more than 16% of water, extracting under constant temperature the beans with at least one dichlorethane thereby dissolving caffein only, removing the extract and then subjecting the beans to pressure treatment with a non-aqueous neutral fluid at a temperature above the boiling point of the dichlorethane used for the purpose of expelling all residual traces of the latter.

6. A method of making caffein-free coffee from raw coffee beans, consisting in giving the raw coffee beans a moisture content not exceeding 16%, heating the moistened beans in a closed space to about 125° C. for about 30 to 40 minutes, cooling down to about 100° C., adding preliminarily heated dichlorethane in the proportion of seven parts of dichlorethane to ten parts of coffee, extracting under pressure at about 100° C., for about 40 min. and then removing the extract, repeating the extraction until the caffein content of the coffee is less than 0.08%, repeatedly extracting the residual coffee with a non-aqueous fluid under pressure at a temperature higher than the boiling point of dichlorethane until every trace of foreign substances is removed from the coffee, and then drying the coffee under diminished pressure.

7. A method of making caffein-free coffee, consisting in moistening about 1000 kg. of raw coffee beans in a chamber until a 16% moisture content of the coffee is attained, sealing the chamber and heating the same under agitation with steam of about 5 atmospheres pressure until a temperature of about 125° C. of the content is reached, maintaining said temperature for about 30 to 40 minutes, then cooling said content to about 100° C., thereupon introducing under pressure about 700 kg. of preliminary heated dichlorethane as extracting agent, raising the temperature and continuing the resultant extraction for about 40 minutes, removing the spent extracting agent and adding a fresh quantity of such extracting agent, and continuing the extraction until the caffein content of the coffee is less than 0.08%, then removing the extraction agent by a non-aqueous fluid under pressure at a temperature higher than the boiling point of the extracting agent, withdrawing the air from said chamber resulting in withdrawing the solvent residues until no trace of foreign substances can be detected, and finally drying the treated coffee under diminished pressure, the complete procedure occupying a time of from 16 to 18 hours.

JEAN MacLANG.